(12) United States Patent
Khan et al.

(10) Patent No.: US 7,757,242 B2
(45) Date of Patent: Jul. 13, 2010

(54) APPARATUS, SYSTEM, AND METHOD FOR ASYNCHRONOUS OUTBOUND TRANSACTION EVENT PROCESSING INTO AN SAP APPLICATION USING SERVICE ORIENTED ARCHITECTURE

(75) Inventors: Zafrulla Khan, Fremont, CA (US); Peter Bow Kwong Lee, Foster City, CA (US)

(73) Assignee: International Business Corporation, Armonk, NY (US)

(*) Notice: Subject to any disclaimer, the term of this patent is extended or adjusted under 35 U.S.C. 154(b) by 1081 days.

(21) Appl. No.: 11/420,606

(22) Filed: May 26, 2006

(65) Prior Publication Data

US 2007/0288943 A1    Dec. 13, 2007

(51) Int. Cl.
G06F 3/00 (2006.01)
G06F 9/44 (2006.01)
G06F 9/46 (2006.01)
G06F 13/00 (2006.01)

(52) U.S. Cl. .................................................. 719/330
(58) Field of Classification Search ................ 719/330
See application file for complete search history.

(56) References Cited

U.S. PATENT DOCUMENTS

| | | | |
|---|---|---|---|
| 4,949,251 A * | 8/1990 | Griffin et al. .............. 714/20 |
| 6,411,963 B1 | 6/2002 | Seese et al. .............. 707/104 |
| 6,466,934 B2 | 10/2002 | Seese et al. .............. 707/4 |
| 6,496,861 B1 | 12/2002 | Sevcik .............. 709/224 |
| 6,513,044 B2 | 1/2003 | Seese et al. .............. 707/104 |
| 6,741,982 B2 | 5/2004 | Soderstrom et al. .......... 707/3 |
| 2003/0023617 A1 * | 1/2003 | Hunt et al. .............. 707/202 |
| 2004/0158549 A1 * | 8/2004 | Matena et al. .............. 707/1 |

OTHER PUBLICATIONS

Scott Robinson, "Understanding the components of SAP IDocs", Aug. 5, 2002, pp. 1-5.*
"How to . . . Handle Acknowledgements for IDoc", Aug. 2004, pp. 1-24.*
Microsoft, "Microsoft Computer Dictionary", 2002, pp. 1-3.*
"SOA: Principles of Service Design", Jul. 18, 2007, pp. 1-3.*
Torry Harris, "Web Services in SOA—Synchronous or Asynchronous?", 2006, pp. 1-6.*
Brahim Medjahed et al. "Business-to-business interactions: issues and enabling technologies" VLDB Journal (2003) 12: 59-85.

(Continued)

Primary Examiner—Andy Ho
Assistant Examiner—Timothy A Mudrick
(74) Attorney, Agent, or Firm—Kunzler Needham Massey & Thorpe

(57) ABSTRACT

An apparatus, system, and method are disclosed for managing outbound transactions in a service oriented architecture. An execution module is included to receive a J2EE Connector Architecture ("J2C") execute command associated with a service data object ("SDO") containing transaction data from a client application. A conversion module is included to convert the SDO to an Intermediate Document ("IDoc"). A transmission module is included to transmit the IDoc and an associated transaction identifier ("TID") to an SAP application using a transaction Remote Function Call ("tRFC") protocol for processing the embedded transaction data. A confirmation module is included to transmit the SDO updated with the TID to the client application in response to acknowledgement of receipt of the transaction data from the SAP application.

16 Claims, 6 Drawing Sheets

OTHER PUBLICATIONS

Edward E. Cobb "The impact of object technology on commercial transaction processing" VLDB Journal (1997) 6: 173-190.

Andrew A. Hanish et al. "Communication protocol design to facilitate re-use based on the object-oriented paradigm" Mobile Networks and Applications (1997) 2: 285-301.

Jack Brassil "Structuring Internet Media Streams With Cueing Protocols" IEEE/ACM Transactions on Networking (2002) vol. 10, Issue 4 pp. 466-476.

"Overview of he ALE interface for outbound processing" (Mar. 2006) http://publib.boulder.ibm.com/infocenter/wbihelp/v6rxmx/topic/com.ibm.wsadapters.jca_sap.doc/doc/ale/csap_ale.html.

Mikhail Genkin "Understanding JCA Transactions" Oct. 19, 2004 http://www-128.ibm.com/developerworks/java/library/j-jca.

"Adapter Architecture: Outbound and Inbound Event Processing" Mar. 2006 http://publib.boulder.ibm.com/infocenter/wbihelp/v6rxmx/topic/com.ibm.wsadapters.jca_sap.doc/csap_how.html.

Kevin Wilson "SAP Connectors: Integration Technologies" (2002) SAPGenie.com.

Martin Keen et al. "Patterns: Implementing an SOA Using an Enterprise Service Bus" IBM Redbooks (2004).

"The RFC API" SAP AG (2001).

Kevin Wilson "SAP Connectors: Integration Technologies" (2002) SAPGenie.com.

* cited by examiner

APPARATUS, SYSTEM, AND METHOD FOR ASYNCHRONOUS OUTBOUND TRANSACTION EVENT PROCESSING INTO AN SAP APPLICATION USING SERVICE ORIENTED ARCHITECTURE

BACKGROUND OF THE INVENTION

1. Field of the Invention

This invention relates to asynchronous outbound transactions and more particularly relates to asynchronous outbound transactions to an SAP application using a service oriented architecture.

2. Description of the Related Art

Communication over the Internet and similar computer networks where components and communication pathways have a tendency to change more easily lends itself to loosely coupled connections using service oriented architectures ("SOA"). Loose coupling describes a relationship between two or more computer systems exchanging data where each end of a communication or transaction makes its requirements explicit and makes few assumptions about the other end. Loose coupling lends itself to replaceable components within or at either end of a communication pathway.

SOA is a perspective of software architecture where services are used to support the requirements of software users. Nodes in an SOA environment make resources available to other participants in the network as independent services that a participant may use in a standardized way. Services interoperate based on a formal definition, or contact, which is independent from the underlying platform and programming language. Software components are reusable and replaceable because the interface is standards-compliant and independent of the underlying implementation of the service. SOA can support integration with a complex enterprise information system ("EIS").

An EIS is a complex computing system that supports a high quality of service, usually dealing with large volumes of data, and is capable of supporting a large organization, such as a banking system or a large retail chain. Examples of enterprise information systems are Oracle®, PeopleSoft®, and SAP®. SAP is a program used for managing business information, customer relations, supply chains, human resources, and product lifecycles, among other services. SAP and other enterprise information systems may exchange information with other enterprise information systems. Integration brokers facilitate information exchange. An example of an integration broker is the WebSphere® Process Server ("WPS"). An integration broker includes an adapter to interface with an enterprise information system, such as SAP, with another enterprise information system or for a client application.

An important form of communication between enterprise information systems is that of a transaction. A transaction involves a related collection of operations. A transaction has the properties of atomicity, consistency, isolation, and durability. Atomicity means that all of the operations are applied or none of them are applied. For example, in a financial transaction, a credit to one account and debit to another account must both be applied or neither applied. Consistency means that the transaction represents a correct transformation of the application state. For example, in a financing, the sum of all asset accounts must equal the sum of all liabilities. Isolation means that the effects of one transaction do not affect other transactions executing concurrently. Durability means that once a transaction successfully completes, changes to the application will survive failures. This is usually accomplished through backing up data and error recovery.

Typically a transaction involving two or more resource applications requires a verification process called a two-phase commit. A two-phase commit involves a first step of sending the required data and accompanying instructions to each resource application for execution. Each resource application executes the required part of the transaction and logs the transaction. Each resource application then typically replies to a resource manager with an agreement message if the transaction succeeded or an abort message. In an asynchronous environment, the agreement message may simply be an acknowledgement that the resource application has successfully received the data for execution. If all the resource applications return a success message, then the resource manager can send a commit message and the resource applications release all locks on the transaction, finalize the changes, and send an acknowledgment to the resource manager. In case of failure of any part of the operation, the resource manager may signal a rollback and all operations are undone and the affected accounts are restored to the state prior to the operation.

Where only one resource application is part of a transaction, a similar procedure may be used to ensure once only delivery of the transaction. Such a transaction may be called a local transaction. A local transaction does not involve a two-phase commit, but may include a commit step after execution of the transaction in the resource application. For one or more resource applications, the resource applications may be running on various enterprise information systems loosely coupled through an integration broker and complying with the SOA. Once only delivery is a method to verify that all parts of a transaction are completed or none at all. For example, if one account is debited and another account is credited in a transaction, once only delivery assures that the debit action and the credit action are processed or neither is processed.

One method for communicating with an SAP application is to use a form of the remote function call ("RFC") protocol. Transactional RFC ("tRFC") protocol is used for asynchronous transactions. SAP applications may use the application link enabling ("ALE") interface or a similar interface for processing asynchronous transactions. Transactions may be inbound or outbound. Outbound transactions with an SAP application are from the perspective of an adapter in communication with the SAP application and cover transactions transmitted to the SAP application from the adapter. Adapters available in the present state of the art for handling outbound asynchronous transactions from an adapter to an SAP application do not support guaranteed once only delivery using J2EE Connector Architecture ("JCA" or "J2C") calls for local transactions. Adapters in the current state of the art handling outbound asynchronous transactions from an adapter to an SAP application also do not support multiple transactions transmitted to the SAP application at one time.

From the foregoing discussion, it should be apparent that a need exists for an apparatus, system, and method for guaranteed delivery for asynchronous J2C outbound transactions to an SAP application using tRFC protocol and the J2C transaction mechanism. Beneficially, such an apparatus, system, and method would convert a service data object comprising at least one business object ("BO") to an intermediate document ("IDoc") for delivery to an SAP application.

SUMMARY OF THE INVENTION

The present invention has been developed in response to the present state of the art, and in particular, in response to the problems and needs in the art that have not yet been fully solved by currently available adapters for interfacing with an SAP application. Accordingly, the present invention has been developed to provide an apparatus, system, and method for managing outbound transactions that overcome many or all of the above-discussed shortcomings in the art.

A method of the present invention is also presented for managing outbound transactions. In one embodiment, the method includes receiving a J2C execute command associated with a service data object ("SDO") from a client application, the SDO containing transaction data. The method includes converting the SDO to an IDoc. The method includes transmitting the IDoc and an associated transaction identifier ("TID") to an SAP application using a tRFC protocol for processing the embedded transaction data. The method includes transmitting the SDO updated with the TID to the client application in response to acknowledgement of receipt of the transaction data from the SAP application.

In a further embodiment, the method includes requesting a TID from the SAP application in response to the SDO lacking a TID. In another embodiment, the method includes transmitting a confirmation of the transaction data with the associated TID to the SAP application in response to receiving a J2C commit command with the associated TID from the client application. The method, in another embodiment, includes transmitting a resource exception to the client application regarding the transaction data and associated TID in response to receiving an error from the SAP application.

In one embodiment, the method includes verifying a connection to the SAP application in response to a J2C begin transaction command from the client application. In another embodiment, a transaction defined by the transaction data of the SDO is executed by the SAP application asynchronously. In yet another embodiment, the SDO comprises at least one business object ("BO") containing transaction data.

Another method of the present invention is also presented for managing outbound transactions. In one embodiment, the method includes sending a J2C execute command associated with an SDO containing transaction data of a transaction to an adapter. The adapter is configured to convert the SDO to an IDoc, and to transmit the IDoc and an associated TID to an SAP application using a tRFC protocol for processing the embedded transaction data. The method includes receiving the SDO updated with the associated TID from the adapter in response to the adapter receiving acknowledgment of receipt of the transaction data from the SAP application. The method includes transmitting a J2C commit command associated with the SDO and the associated TID to the adapter. The adapter is configured to transmit a confirmation of the transaction data with the associated TID to the SAP application in response to the J2C commit command.

The method, in one embodiment, includes storing the TID for asynchronous management of the associated transaction. In another embodiment, the method includes transmitting a J2C begin command to the adapter. The adapter is configured to verify connection with the SAP application in response to the J2C begin command. The adapter, in another embodiment, is configured to request a TID from the SAP application to associate with a received SDO in response to receiving the SDO without a TID. In yet another embodiment, the J2C commands are J2C local transaction commands.

A system of the present invention is also presented to manage outbound transactions. The system to manage outbound transactions is provided with a plurality of modules configured to functionally execute the necessary steps of managing asynchronous outbound transactions using the tRFC protocol with an SAP application through J2C transaction commands. The system may be embodied by an SAP application with an SAP interface, a client application on an integration broker, and an adapter on the integration broker in communication with the client application and loosely coupled to the SAP interface of the SAP application. In particular, the adapter, in one embodiment, includes an execution module that receives a J2C execute command associated with an SDO from a client application, the SDO containing transaction data of a transaction. The adapter includes a conversion module that converts the SDO to an IDoc. The adapter includes a transmission module that transmits the IDoc and an associated TID to the SAP application using a tRFC protocol through the SAP interface for processing the embedded transaction data. The adapter includes a confirmation module that transmits the SDO updated with the TID to the client application in response to acknowledgment of receipt of the transaction data from the SAP application.

The adapter may further include a transaction ID module that requests a TID from the SAP application in response to the SDO lacking a TID. In another embodiment, the adapter includes a commit module that transmits a confirmation of the transaction data with the TID to the SAP application through the SAP interface in response to receiving a J2C commit command with the associated TID from the client application. In another embodiment, the adapter includes a begin module that verifies a connection to the SAP application in response to a J2C begin transaction command from the client application.

Another method of the present invention is also presented for managing outbound transactions through an integration broker and associated adapter. The method includes determining customer integration broker connection requirements and executing an adapter for managing outbound J2C transactions to an SAP application. The adapter is configured to receive a J2C execute command associated with an SDO from a client application, the SDO containing transaction data, and convert the SDO to an IDoc. The adapter is configured to transmit the IDoc and an associated TID to an SAP application using a tRFC protocol for processing the embedded transaction data. The adapter is also configured to transmit the SDO updated with the associated TID to the client application in response to acknowledgement of receipt of the transaction data from the SAP application.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
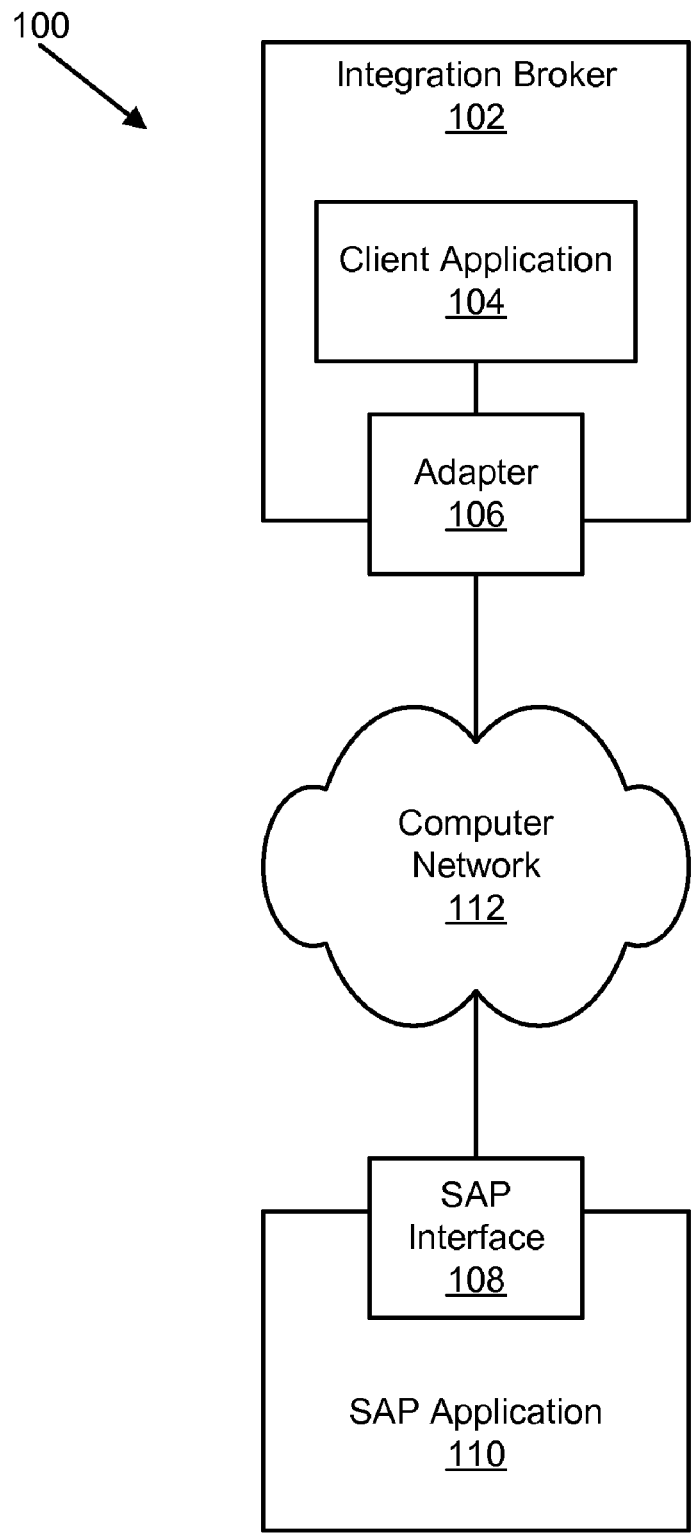
FIG. 1 is a schematic block diagram illustrating one embodiment of a system for managing outbound transactions in service oriented architecture in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for managing outbound transactions in service oriented architecture in accordance with the present invention. The system 100 includes an integration broker 102 with a client application 104 and an adapter 106. The adapter 106 of the integration broker 102 is loosely coupled to an SAP interface 108 of an SAP application 110 through a computer network 112. The components of the system 100 are described in detail below.

The integration broker 102 is a form of middleware that facilitates connection between a client application 104 or EIS and another EIS. Examples of the integration broker 102 are the WebSphere® Application Server ("WAS") from IBM®, the BEA WebLogic Server®, and the SAP NetWeaver®.

A client application 104 may be running on an integration broker 102 or may be in communication with the integration broker 102 through a computer network 112 such as the Internet. The client application 104 may handle financial data, inventory, order tracking, or the like. The client application 104 has the ability to generate transactions that involve transmitting data to the SAP application 110. The SAP application 110 is a proprietary EIS from SAP AG, Walldorf, Germany. One version of SAP is SAP R/3. The SAP application 110 may comprise one or more applications running on the SAP application 110.

Typically, the SAP application 110 handles asynchronous transactions using the tRFC protocol through the SAP interface 108. The SAP interface 108 is provided by SAP for the exchange of business data between loosely-coupled SAP applications. The vehicle for data transfer with the SAP application 110 through the SAP interface 108 is an intermediate document ("IDoc"). An IDoc is a container for the application data to be transmitted.

The SAP application 110, through the SAP interface 108, and the client application 104, through the adapter 106, are loosely coupled through the computer network 112. The computer network 112 may be any communication network supporting asynchronous transactions and loose coupling. The computer network 112 may comprise the Internet, a local area network, a wide area network, a combination of computer networks, etc. The computer network 112 may comprise switches, hubs, routers, wiring, fiber optic equipment, wireless equipment, and the like. One of skill in the art will recognize other forms of a computer network 112 allowing asynchronous transactions between loosely-coupled components compliant with SOA. The adapter 106 is described in relation to FIGS. 2, 3, and 4.

Figure 2:
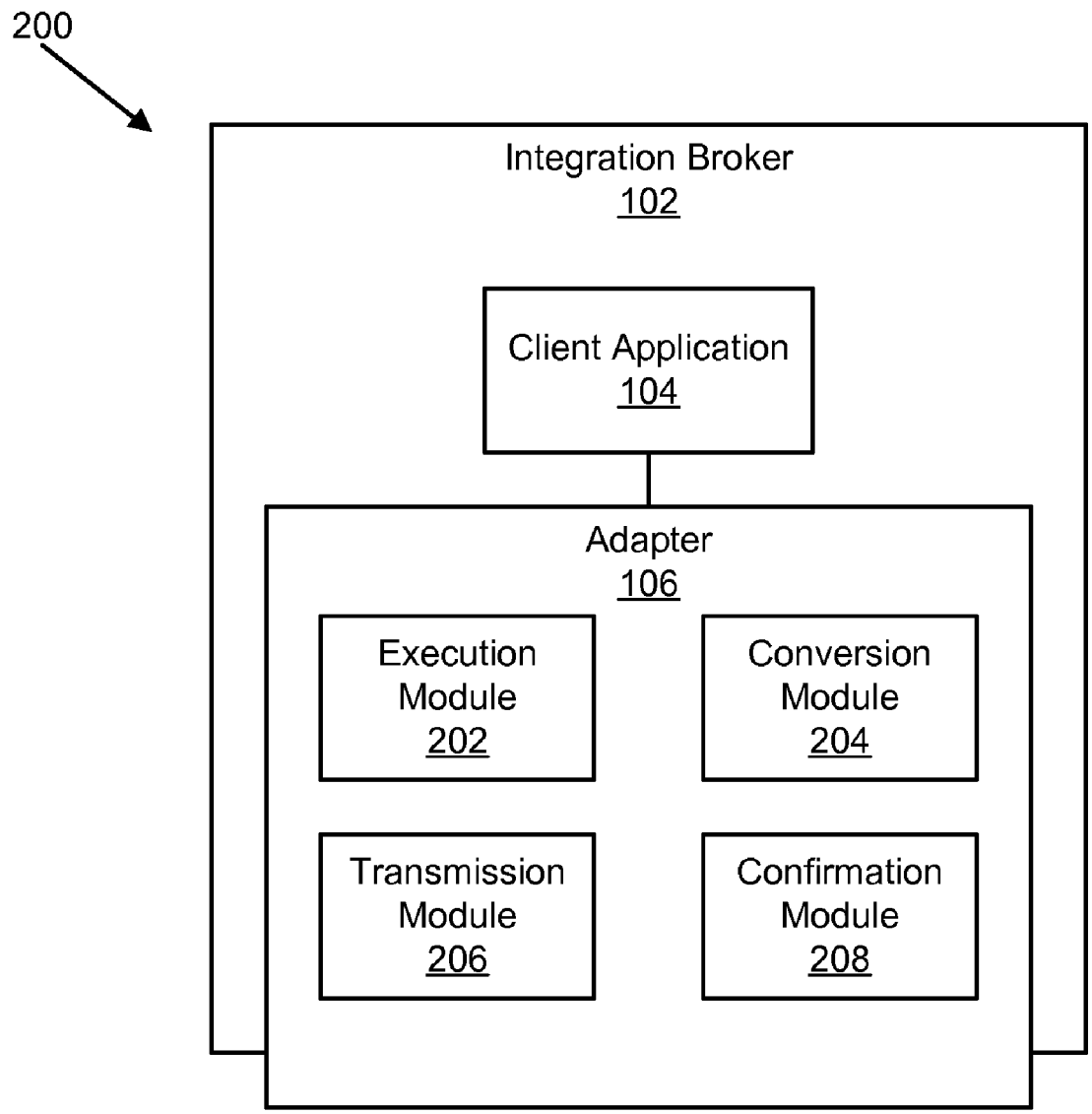
FIG. 2 is a schematic block diagram illustrating one embodiment of an apparatus for managing outbound transactions in accordance with the present invention.

FIG. 2 is a schematic block diagram illustrating one embodiment of an apparatus 200 for managing outbound transactions in accordance with the present invention. The apparatus 200 includes an integration broker 102, client application 104, and adapter 106 substantially similar to those described in relation to FIG. 1. The adapter 106 includes an execution module 202, a conversion module 204, a transmission module 206, and a confirmation module 208 which are described below.

The execution module 202 is configured to receive a J2C execute command associated with an SDO containing transaction data from the client application 104. The J2C execute command conforms to the J2C protocol and instructs an application to perform one or more operations associated with a transaction. Transaction data associated with the transaction is typically in the form of a business object ("BO") in an SDO. The SDO may contain one or more BOs. An SDO may contain application specific information in the form of metadata. The application specific information provides information necessary for an application to properly execute operations involving transactional data contained in a BO in the SDO. For example, application specific information may include specific operations, an order of operations, required data, etc.

The conversion module 204 converts the SDO to an IDoc. The conversion module 204 maps transaction data in each BO contained in the SDO into an IDoc. An IDoc is a flat structure constructed to allow multiple IDocs within one IDoc. An IDoc with more than one sub-IDoc may be called an IDoc packet and herein may be referred to as an IDoc packet or an IDoc. The IDoc is compliant with the tRFC protocol used by the SAP interface 108 of the SAP application 110. In one embodiment, the IDoc may also include metadata from the SDO in the form of data stored in a control record within an IDoc. Metadata from an SDO typically is used by the conversion module 204.

The transmission module 206 transmits the IDoc and an associated transaction identifier ("TID") to the SAP application 110 using the tRFC protocol through the SAP interface 108 for processing the embedded transaction data. A TID is a unique identifier assigned to a transaction by the SAP application 110 and allows tracking of a transaction for assuring once only delivery. The transaction module 206 transmits the IDoc asynchronously. The transaction module 206 may receive an acknowledgement of receipt of the IDoc from the SAP application 110. The transmission of the IDoc and subsequent acknowledgement may be synchronous, but does not include synchronous notification from the SAP application 110 that the IDoc has been processed.

The confirmation module 208 transmits the SDO updated with the TID to the client application 104 after the transmission module 206 receives an acknowledgement of receipt of the transaction data in the form of an IDoc from the SAP application 110. The client application 104 manages the transaction. While the client application 104 may already have a copy of the SDO, transmitting the SDO along with the TID allows the client application 104 to associate the TID with the one or more transaction operations associated with transaction data contained in the SDO.

Figure 3:
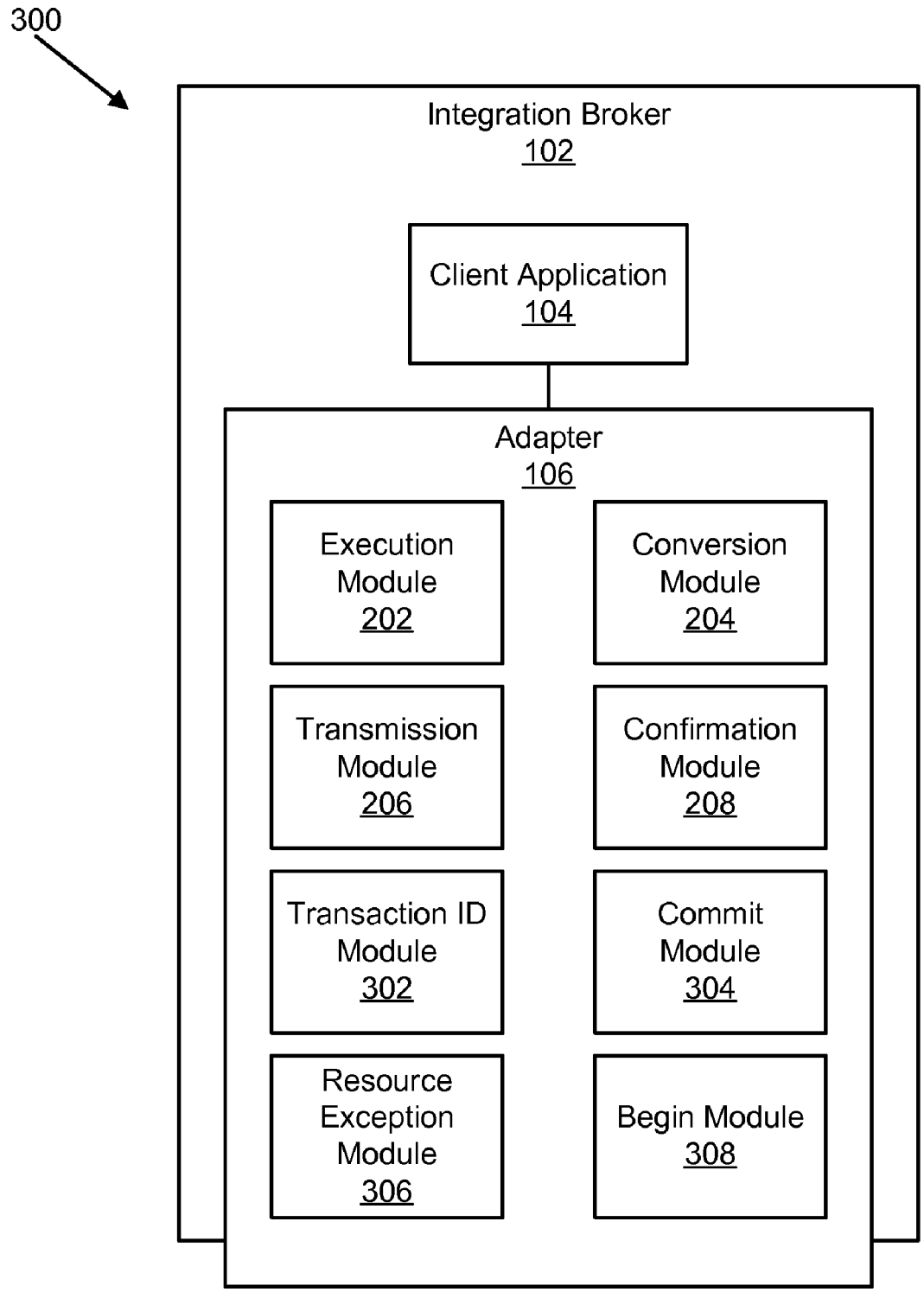
FIG. 3 is a schematic block diagram illustrating another embodiment of an apparatus for managing outbound transactions in accordance with the present invention.

FIG. 3 is a schematic block diagram illustrating another embodiment of an apparatus 300 for managing outbound transactions in accordance with the present invention. The apparatus 300 includes an integration broker 102 with a client application 104 and adapter 106 substantially similar to those described in relation to FIG. 1. The adapter 104 includes an execution module 202, a conversion module 204, a transmission module 206, and a confirmation module 208 substantially similar to the modules described in relation to FIG. 2. The adapter 106 also includes a transaction ID module 302, a commit module 304, a resource exception module 306, and a begin module 308 which are described below.

The adapter 106 includes a transaction ID module 302 configured to request a TID from the SAP application 110 in response to the SDO not having a TID. For example, if the client application 104 transmits an SDO to the adapter 106 and there has been no previous attempt to process the transaction associated with the SDO, the SDO will typically not have an assigned TID when it reaches the adapter 106. In this case, the transaction ID module 302 requests a TID from the SAP application 110. Typically, the SAP application 110 responds by generating a new TID. The SAP application 110 typically stores the TID along with a status in an SAP event tracking repository within or accessible to the SAP application 110. If transaction data associated with the TID has been processed by the SAP application 110, the SAP application 110 will change the status associated with the TID to ensure that the associated transaction data is processed only once. For example, the status may be "completed." The adapter 106 would typically only receive an SDO with a TID for further processing if there was previously an error in the processing of the transaction data associated with the SDO and TID. In such a case, the status may be "error." One of skill in the art will recognize other situations when an adapter 106 will receive an SDO with or without a TID and the transaction ID module 302 will request a TID from the SAP application 110 if the SDO has no TID.

The adapter 106 includes a commit module 304 configured to transmit a confirmation of the transaction data with the associated TID to the SAP application 110 through the SAP interface 108 in response to receiving a J2C commit command with the associated TID from the client application 104. In this manner, the client application 104 can control committing a transaction among loosely coupled components using asynchronous interfaces. Typically, the client application 104 sends a J2C commit command to the adapter 106 after the confirmation module 208 transmits the SDO updated with the associated TID to the client application 104. Receipt of the SDO and associated TID by the client application 104 indicates that the transaction data has been successfully and asynchronously transmitted to the SAP application 110. The confirmation transmitted to the SAP application 110 includes the TID so that the SAP application 110 can correlate the confirmation with the previously received IDoc. In one embodiment, the confirmation comprises an "on ConfirmTID" call as defined by the SAP interface. The "on ConfirmTID" call stores the TID in permanent storage of the SAP and helps to ensure that the transaction is started only once. The confirmation transmitted to the SAP application 110 complies with the tRFC protocol. The tRFC protocol allows asynchronous transactions to be sent to the SAP application 110 through the SAP interface 108. Asynchronous transactions are advantageous in a SOA because a transaction command may be passed to an application and the computer passing the transaction may go on to process other requests instead of synchronously waiting for a response. In addition, asynchronous transactions are compatible with a client application 104 connected to another application through a computer network 112 that is not always available, that may be intermittently connected, or that may switch data pathways.

In one embodiment, the SAP application 110 places transaction data from the previously received IDoc in a queue for processing and the related confirmation in the queue to be processed after the transaction data. In another embodiment, the SAP application 110 processes the transaction data from the previously received IDoc before receiving the confirmation and then commits the operations associated with processing the transaction data after receiving the confirmation from the adapter 106. One of skill in the art will recognize other ways for an SAP application 110 to confirm or commit transaction data from an IDoc after receiving a confirmation with a TID associated with the transaction data of the IDoc.

Typically, the SAP application 110 will synchronously transmit an acknowledgement of receipt of a confirmation and associated TID to the adapter 106. The adapter 106 is typically loosely coupled to the SAP application 110 and the IDoc and subsequent confirmation are transmitted asynchronously to the SAP application 110. Because the data is sent asynchronously, including the TID allows the SAP application 110 to keep track of the transaction data associated with the TID.

The adapter 106 includes a resource exception module 306 configured to transmit a resource exception to the client application 104 regarding the transaction data and an associated TID in response to receiving an error or exception from the SAP application 110. The SAP application 110 may experience an error processing transaction data associated with a TID. The error may be due to a computer crash, transmission error, or the like while processing the transaction data or a subsequent confirmation. After an error, the SAP application 110 may transmit an error message related to the transaction data to the adapter 106. The resource exception module 306 then transmits a resource exception or some other message indicating a problem with the transaction data to the client application 104.

In another embodiment, the resource exception module 306 transmits a resource exception or similar message to the client application 104 after not receiving an acknowledgement during a timeout period from the SAP application 110 of receipt of the IDoc or confirmation. In yet another embodiment, the resource exception module 306 transmits a resource exception or similar message to the client application 104 after the adapter 106 encounters an error processing the SDO, communicating with the SAP application 110, or the like. One of skill in the art will recognize other messages and situations appropriate to signal the client application 104 of a problem with an SDO sent to the adapter 106 for processing by the SAP application 110.

The adapter 106 includes a begin module 308 configured to verify a connection to the SAP application 110 in response to a J2C begin transaction command from the client application. In one embodiment, the first step of starting a transaction by the client application 104 is to issue a J2C begin call to the adapter 106. In this manner, the client application 104 can control the beginning of a transaction among loosely coupled components using asynchronous interfaces. The adapter 106 may respond by verifying a connection to the SAP application 110 through the SAP interface 108. In one embodiment, the adapter 106 responds to the client application 104 by sending an acknowledgement to the client application 104 that a connection exists from the adapter 106 to the SAP application 110. In another embodiment, the adapter 106 does not send an acknowledgement to the client application 104, but sends a message to the client application 104 when the adapter 106 has not successfully established a connection to the SAP application. One of skill in the art will recognize other appropriate responses of an adapter 106 to a J2C begin transaction command.

Figure 4:
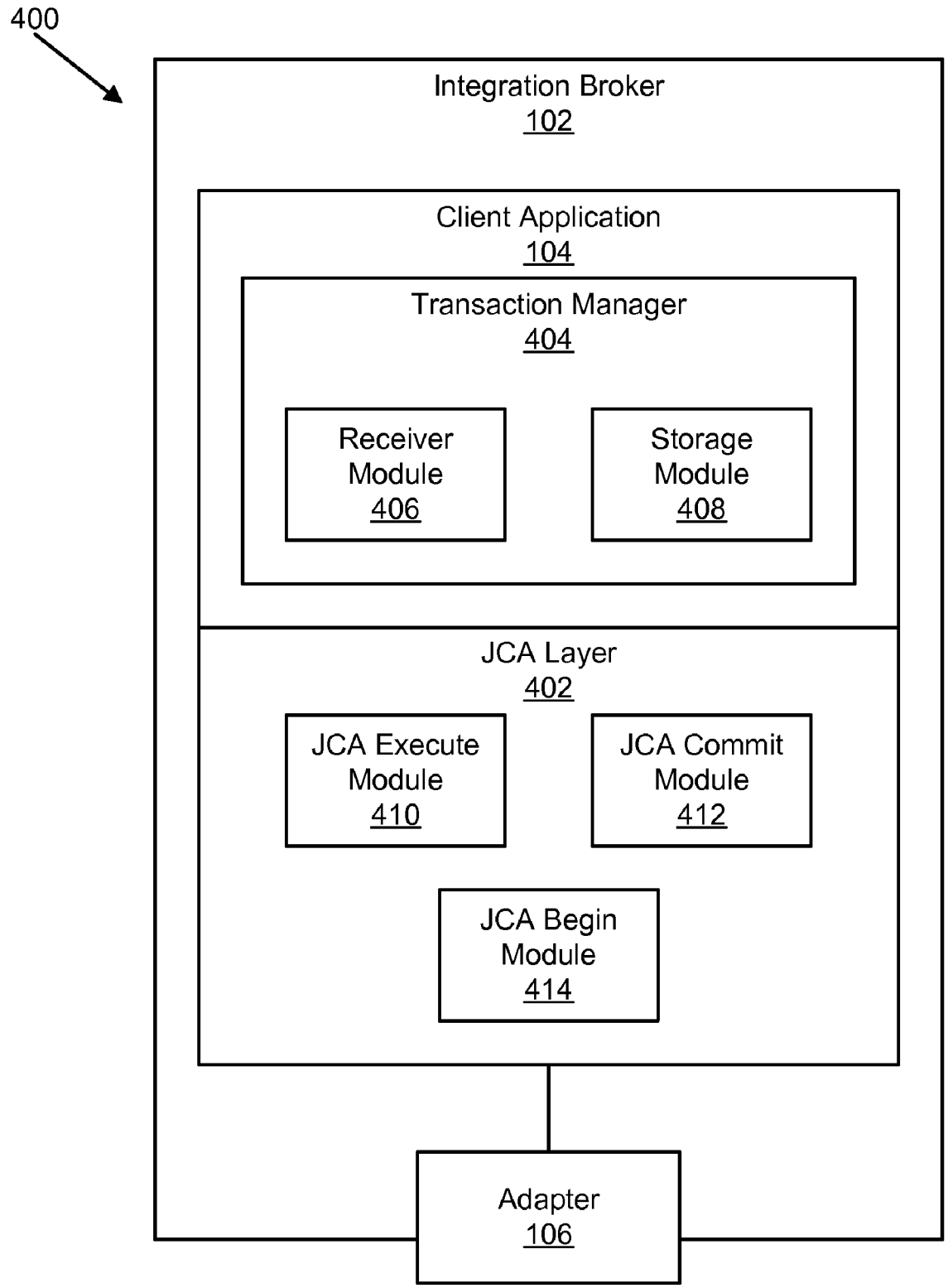
FIG. 4 is a schematic block diagram illustrating an alternate embodiment of an apparatus for managing outbound transactions in accordance with the present invention.

FIG. 4 is a schematic block diagram illustrating an alternate embodiment of an apparatus 400 for managing outbound transactions in accordance with the present invention. The apparatus 400 includes an integration broker 102 with a client application 104 and adapter 106 substantially similar to those described in relation to FIG. 1. The apparatus 400 includes a client application 104 with a J2C layer 402. The client application includes a transaction manager 404 with a receiver module 406 and a storage module 408. The J2C layer 402 includes a J2C execute module 410, a J2C commit module 412, and a J2C begin module 414. The modules and components of the apparatus 400 are described below.

The apparatus 400 includes with the client application 104 a J2C layer 402. The J2C layer 402 receives instructions and data from the client application and issues J2C commands. The J2C layer 402 creates properly formatted J2C calls based on the instructions from the client. The J2C layer 402 may format data received from the client application 104 to be compatible with the appropriate J2C command. In one embodiment, the J2C layer 402 is part of the client application 104. In another embodiment, the J2C layer 402 is part of the integration broker 102. In yet another embodiment, the J2C layer 402 is part of the adapter 106. One of skill in the art will recognize other forms of a J2C layer 402 capable of receiving transaction commands and data from a client application 104 to formulate and send J2C commands.

The client application 104 includes a transaction manager 404. The transaction manager 404 controls and tracks transactions from the client application 104. The transaction manager 404 tracks transaction data and an associated TID for each transaction. The transaction manager 404 may include an event tracking table and may track status information regarding each transaction being tracked. The transaction manager 404 may be included with the client application 104 or may be in the integration broker 102 and controlled by the client application 104. One of skill in the art will recognize other forms of a transaction manager 404 capable of tracking and controlling a transaction of a client application 104.

The J2C layer 402 includes a J2C execute module 410 configured to send a J2C execute command associated with an SDO containing transaction data of a transaction to the adapter 106. The J2C execute module 410 is directed by the transaction manager 404 to implement a J2C execute command with an associated SDO and send the execute command to the adapter 106. In one embodiment, the J2C execute module 410 includes a TID associated with the SDO. Typically the J2C execute module 410 would send an SDO with a TID if the SDO was previously transmitted to the adapter 106 for execution by the SAP application 110 and there was an error of some type preventing completion of processing and subsequent confirmation by the SAP application 110. In another embodiment, the J2C execute module 410 does not include a TID. For example, the J2C execute module 410 may send a J2C execute command with an SDO to the adapter 106 without a TID when the associated transaction is first submitted for processing. The adapter 106, in one embodiment, is configured to convert the SDO to an IDoc and to transmit the IDoc and an associated TID to an SAP application using a tRFC protocol through the SAP interface 108 for processing the embedded transaction data.

The transaction manager 404 includes a receiver module 406 configured to receive the SDO updated with the associated TID from the adapter 106. The adapter 106 is configured to receive an acknowledgment of receipt of the transaction data from the SAP application 110. In one embodiment, the receiver module 406 is in the client application 104 and is controlled by the transaction manager 404. The receiver module 406 may then update a status of the transaction by associating the received TID with the received SDO. In one embodiment, the SDO includes a status in metadata of the SDO. The status may be "in progress" or something similar to indicate that the SAP application 110 has the transaction data from the SDO and associated TID and processing of the transaction data is in progress. In another embodiment, the SDO and TID include no status information and the receiver module 406 recognizes that an SDO and TID in this form represents that the transaction data of the SDO is being processed by the SAP application 110.

The transaction manager 404 includes a storage module 408 configured to store the TID for asynchronous management of the associated transaction. In one embodiment, the storage module 408 includes a table or other repository to store transaction information. The table may include information such as some type of application transaction identifier assigned by the client application 104, an associated TID, a transaction status, and the like. The storage module 408, in one embodiment, stores a TID and related transaction data from an SDO after the receiver module 406 receives an SDO and associated TID and relates the two. In another embodiment, the storage module 408 stores an application transaction identifier assigned by the client application 104 or transaction manager 404 to the SDO along with the TID after the receiver module 406 receives an SDO and associated TID and relates the two. One of skill in the art will recognize other ways for a storage module 408 to store information for tracking events related to a transaction.

The J2C Layer 402 also includes a J2C commit module 412 configured to transmit a J2C commit command associated with the SDO and the associated TID to the adapter 106. The J2C commit module 412 may issue a J2C commit command in response to direction from the transaction manager 404. Typically the J2C commit module 412 issues a J2C commit command after the receiver module 406 has received some type of indication that the SAP application 110 has acknowledged receipt of the SDO and associated TID. In addition, the transaction manager 404 may be managing transaction data sent to another resource or EIS related to the transaction tracked by the TID and may delay the J2C commit module 412 from sending a J2C commit command until the transaction data sent to the other resource or EIS is processed in some way. The adapter 106 is configured to transmit a confirmation of the transaction data with the associated TID to the SAP application 110 through the SAP interface 108 in response to the J2C commit command. The SAP application 110 may be configured to confirm the processed transaction data by committing the operations of the transaction data, releasing locks on accounts affected by the transaction data, etc. One of skill in the art will recognize other ways for the J2C commit module 412 to transmit a J2C commit command and associated TID in response to direction from a transaction manager 404.

The J2C layer 402 includes a J2C begin module 414 that transmits a J2C begin command to the adapter 106. In one embodiment, the transaction manager 404 instructs the J2C begin module 414 to issue the J2C begin command to the adapter 106 when the transaction manager 404 starts a transaction. The adapter 106 verifies a connection with the SAP application 110 in response to the J2C begin command.

Figure 5:
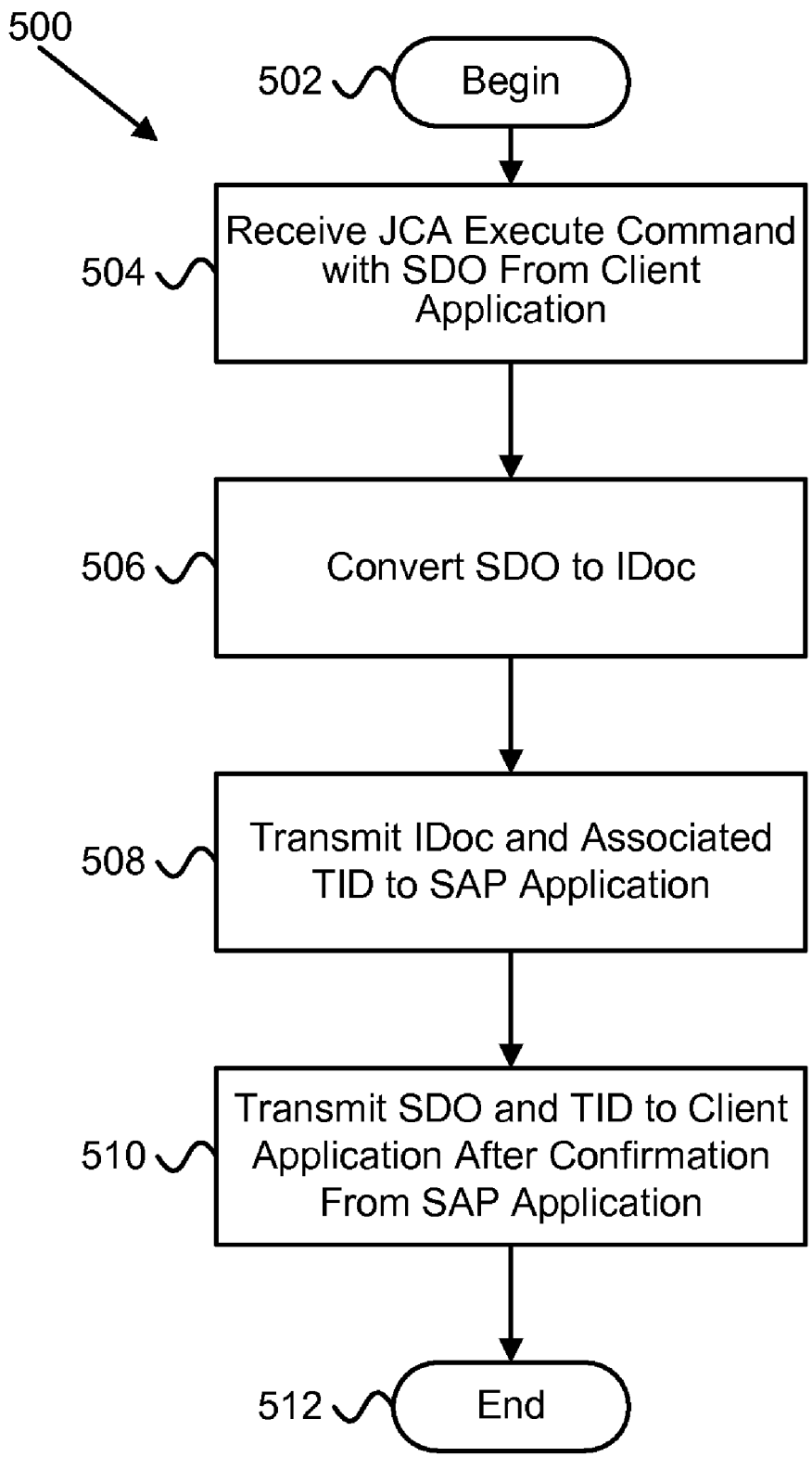
FIG. 5 is a schematic flow chart diagram illustrating one embodiment of a method for managing outbound transactions in accordance with the present invention.

FIG. 5 is a schematic flow chart diagram illustrating one embodiment of a method 500 for managing outbound transactions in accordance with the present invention. The method 500 begins 502 and the execution module 202 receives 504 a J2C execute command associated with an SDO containing transaction data from the client application 104. The conversion module 204 converts 506 the SDO to an IDoc. Typically, the conversion module 204 has a TID associated with the SDO if the TID is sent from the client application 104, through the transaction manager 404 and J2C layer 402. The client application 104 typically sends an SDO with a TID in the situation where the transaction failed previously.

The transmission module 206 transmits 508 the IDoc and the associated TID to the SAP application 110 through the SAP interface 108 using the tRFC protocol. The SAP interface 108 communicates transaction data asynchronously using the tRFC protocol and IDocs so any transaction data sent to the SAP application 110 through the SAP interface 108 must comply with the tRFC protocol and should be in the form of an IDoc. The confirmation module 208 transmits 510 the SDO with the associated TID to the receiver module 406 of the client application 104 after receiving an acknowledgement of receipt of the transaction data from the SAP application 110 and the method 500 ends 512. Typically the adapter 106 sends an IDoc and TID to the SAP application 110 and the SAP application 110 synchronously transmits an acknowledgement of receipt of the transaction data.

Figure 6:
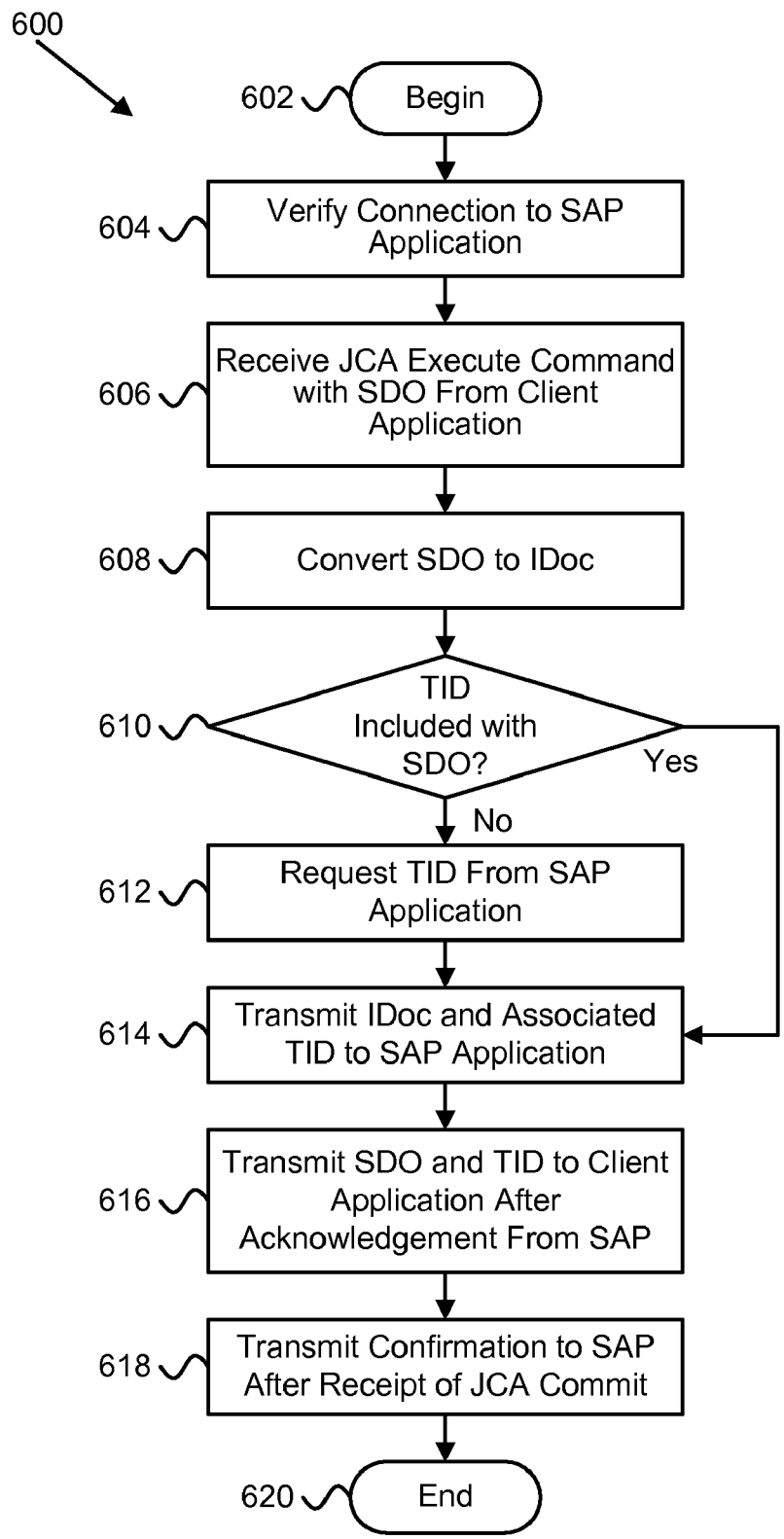
FIG. 6 is a schematic flow chart diagram illustrating another embodiment of a method for managing outbound transactions in accordance with the present invention.

FIG. 6 is a schematic flow chart diagram illustrating another embodiment of a method 600 for managing outbound transactions in accordance with the present invention. The method 600 begins 602 and the begin module 308 verifies 604 connection the to the SAP application 110. The execution module 202 receives 606 a J2C execute command associated with an SDO containing transaction data from the client application 104 and the conversion module 204 converts 608 the SDO to an IDoc. An SDO includes one or more BOs. Each BO may contain transaction data from one or more transactions. A BO may include data for a single transaction or may include other BOs or "children" BOs. The SDO with one BO is converted to an appropriate IDoc. An SDO with more than one BO is converted to an IDoc packet having multiple IDocs. Each IDoc corresponds to a BO. An IDoc and an IDoc packet are flat structures. For an IDoc packet, BOs from an SDO are formatted during conversion such that the IDoc packet includes appropriate references and mapping to reflect the complex nature of the BOs being converted. Iocs and IDoc packets may be generated based on metadata from the SDO. In one embodiment, metadata from an SDO may also be included in a control record of an IDoc or IDoc packet. The metadata may include application specific information from the client application 104 or information necessary for proper processing by the particular SAP application 110.

The transaction ID module 302 determines 610 if the SDO includes an associated TID. If the transaction ID module 302 determines 610 that the SDO does not include an associated TID, the transaction ID module 302 requests 612 a TID from the SAP application 110. Typically, when the client application 104 begins a new transaction or a transaction failed before receiving a TID, the client application 104 sends, by way of the transaction manager 404 and J2C layer 402 an SDO without a TID to the adapter 106. The transmission module 206 transmits 614 the IDoc and the associated TID to the SAP application 110 using the tRFC protocol through the SAP interface 108.

If the transaction ID module 302 determines 610 that the SDO includes an associated TID, the conversion module 204 converts 612 the SDO and associated TID to an IDoc. The transmission module 206 transmits 614 the IDoc and the associated TID to the SAP application 110 using the tRFC protocol through the SAP interface 108. The confirmation module 208 transmits 616 the SDO and associated TID to the receiver module 406 of the client application 104 after receiving acknowledgement of receipt of the transaction data and TID from the SAP application 110.

After receiving the SDO and associated TID, the SAP application 110 typically places the transaction data in a queue for processing if the SAP application 110 verifies that transaction data associated with the TID has not been processed previously. If the SAP application 110 determines that transaction data related to the TID has been processed previously, the SAP application 110 will not process the transaction data and will notify the adapter 106 that the transaction data has been processed previously. The commit module 304 transmits 616 a confirmation of the transaction data and associated TID to the SAP application 110 after receiving a J2C commit command from the J2C commit module 412 and the method 600 ends 620. The SAP application 110 typically confirms processing of the transaction data associated with the TID and releases any locks on accounts affected by the transaction data, updates a status associated with the TID to reflect that the transaction data has been processed, and allows any pending transactions related to the account affected by the transaction data. One of skill in the art will recognize other actions taken by the SAP application 110 in response to receiving an IDoc with an associated TID and a subsequent confirmation.

If at any time the SAP application 110 encounters an error in processing the transaction data and TID from a received IDoc, the SAP application 110 may transmit an exception or other error with the associated TID to the adapter 106. If the adapter 106 receives an exception or error from the SAP application 110 or encounters an error processing transaction data from a received SDO, the adapter 106 transmits to the client application 104 a resource exception or similar message to the client application with a TID or other means to identify the transaction data for which there was an error. One of skill in the art will recognize other ways to communicate an error in processing a transaction to the client application 104.

The present invention is advantageous because it allows outbound transactions to an SAP application 110 using local J2C transactions. In contrast to other ways of executing transactions with an SAP application 110, such as using Java Transaction API ("JTA"), local J2C transactions take advantage of connection pooling, connection management logic, compatibility with other connector architectures for access to EIS's, security, and transaction management available using SCA. The J2C local transactions use SDOs that include BOs. The SDOs are sent to an adapter 106 using J2C commands for once only processing by an SAP application 110. The adapter 106 transmits the commands using tRFC protocol to the SAP application 110 asynchronously. The client application 104 and the SAP application 110 may be loosely coupled using a service oriented architecture. The adapter 106 has the advantage of converting an SDO to an IDoc for transmission to the SAP application 110 through the SAP interface 108 using the tRFC protocol. Through the use of J2C begin, execute, and commit commands, the present invention facilitates once only delivery and processing of transaction data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code programmed for managing outbound transactions, the operations of the computer program product comprising:
   receiving a J2EE Connector Architecture ("J2C") execute command associated with a service data object ("SDO") from a client application, the SDO containing transaction data, the J2C execute command comprising a local transaction command according to J2C protocol;
   converting the SDO to an Intermediate Document ("IDoc");
   requesting a transaction identifier ("TID") to associate with the SDO, the TID requested from a SAP application in response to the SDO lacking an associated TID, the TID originating from the SAP application and assigned by the SAP application, the SAP application using a transaction Remote Function Call ("tRFC") protocol, wherein the J2C protocol and the tRFC protocol comprise disparate transaction protocols;
   transmitting the IDoc and the associated TID to the SAP application using the tRFC protocol for processing the transaction data; and
   transmitting the SDO updated with the TID to the client application in response to acknowledgement of receipt of the transaction data from the SAP application.

2. The computer program product of claim 1, further comprising transmitting a confirmation of the transaction data with the associated TID to the SAP application in response to receiving a J2C commit command with the associated TID from the client application.

3. The computer program product of claim 1, further comprising transmitting a resource exception to the client application regarding the transaction data and associated TID in response to receiving an error from the SAP application.

4. The computer program product of claim 1, further comprising verifying a connection to the SAP application in response to a J2C begin transaction command from the client application.

5. The computer program product of claim 1, wherein a transaction defined by the transaction data of the SDO is executed by the SAP application asynchronously.

6. The computer program product of claim 1, wherein the SDO comprises at least one business object ("BO") containing transaction data.

7. A computer program product comprising a computer readable storage medium having computer usable program code programmed for managing outbound transactions, the operations of the computer program product comprising:
sending a J2EE Connector Architecture ("J2C") execute command associated with a service data object ("SDO") containing transaction data of a transaction to an adapter, the J2C execute command comprising a local transaction command according to the J2C protocol, the adaptor configured to:
convert the SDO to an intermediate document ("IDoc");
request a transaction identifier ("TID") to associate with the SDO, the TID requested from a SAP application in response to the SDO lacking an associated TID, the TID originating from the SAP application and assigned by the SAP application, the SAP application using a transaction Remote Function Call ("tRFC") protocol, wherein the J2C protocol and the tRFC protocol comprise disparate transaction protocols; and
transmit the IDoc and the associated TID to the SAP application using the tRFC protocol for processing the transaction data;
receiving the SDO updated with the associated TID from the adapter in response to the adapter receiving acknowledgment of receipt of the transaction data from the SAP application; and
transmitting a J2C commit command associated with the SDO and the associated TID to the adapter, wherein the adapter is configured to transmit a confirmation of the transaction data with the associated TID to the SAP application in response to the J2C commit command.

8. The computer program product of claim 7, further comprising storing the TID for asynchronous management of the associated transaction.

9. The computer program product of claim 7, further comprising transmitting a J2C begin command to the adapter, wherein the adapter is configured to verify connection with the SAP application in response to the J2C begin command.

10. The computer program product of claim 7, wherein the transaction defined by the transaction data of the SDO is executed by the SAP application asynchronously.

11. The computer program product of claim 7, wherein the SDO comprises at least one business object ("BO") containing transaction data for the SDO.

12. A system to manage outbound transactions in service oriented architecture ("SOA"), the system comprising:
an SAP application with a SAP interface;
a client application on an integration broker; and
an adapter on the integration broker in communication with the client application, the adapter loosely coupled to the SAP interface of the SAP application, the adapter comprising a memory for execution by a processor, the memory comprising
an execution module configured to: receive a J2EE Connector Architecture ("J2C") execute command associated with a service data object ("SDO") from a client application, the SDO containing transaction data of a transaction, the J2C execute command comprising a local transaction command according to the J2C protocol;
a conversion module configured to convert the SDO to an Intermediate Document ("IDoc");
a transaction ID module configured to request a transaction identifier ("TID") to associate with the SDO, the TID requested from the SAP application in response to the SDO lacking an associated TID, the TID originating from the SAP application and assigned by the SAP application, the SAP application using a transaction Remote Function Call ("tRFC") protocol, wherein the J2C protocol and the tRFC protocol comprise disparate transaction protocols;
a transmission module configured to transmit the IDoc and the associated TID to the SAP application using the tRFC protocol through the SAP interface for processing the transaction data; and
a confirmation module configured to transmit the SDO updated with the TID to the client application in response to acknowledgment of receipt of the transaction data from the SAP application.

13. The system of claim 12, further comprising a commit module configured to transmit a confirmation of the transaction data with the TID to the SAP application through the SAP interface in response to receiving a J2C commit command with the associated TID from the client application.

14. The system of claim 12, further comprising a begin module configured to verify a connection to the SAP application in response to a J2C begin transaction command from the client application.

15. A method for managing outbound transactions through an integration broker and associated adapter, the method comprising:
determining customer integration broker connection requirements;
executing an adapter for managing outbound J2EE Connector Architecture ("J2C") transactions to a SAP application, the J2C transactions comprising local transactions according to the J2C protocol, the adapter configured to:
receive a J2C execute command associated with a service data object ("SDO") from a client application, the SDO containing transaction data;
convert the SDO to an Intermediate Document ("IDoc");
request a transaction identifier ("TID") to associate with the SDO, the TID requested from the SAP application in response to the SDO lacking an associated TID, the TID originating from the SAP application and assigned by the SAP application, the SAP application using a transaction Remote Function Call ("tRFC") protocol, wherein the J2C protocol and the tRFC protocol comprise disparate transaction protocols;
transmit the IDoc and the associated TID to the SAP application using the tRFC protocol for processing the transaction data; and
transmit the SDO updated with the associated TID to the client application in response to acknowledgement of receipt of the transaction data from the SAP application.

16. The method of claim 15, further comprising transmitting a J2C begin command to the adapter, wherein the adapter is configured to verify connection with the SAP application in response to the J2C begin command.

* * * * *